Nov. 19, 1963  P. L. GLOCKER  3,111,002
SETTING MECHANISM FOR WATCH MOVEMENTS
Filed Jan. 26, 1961
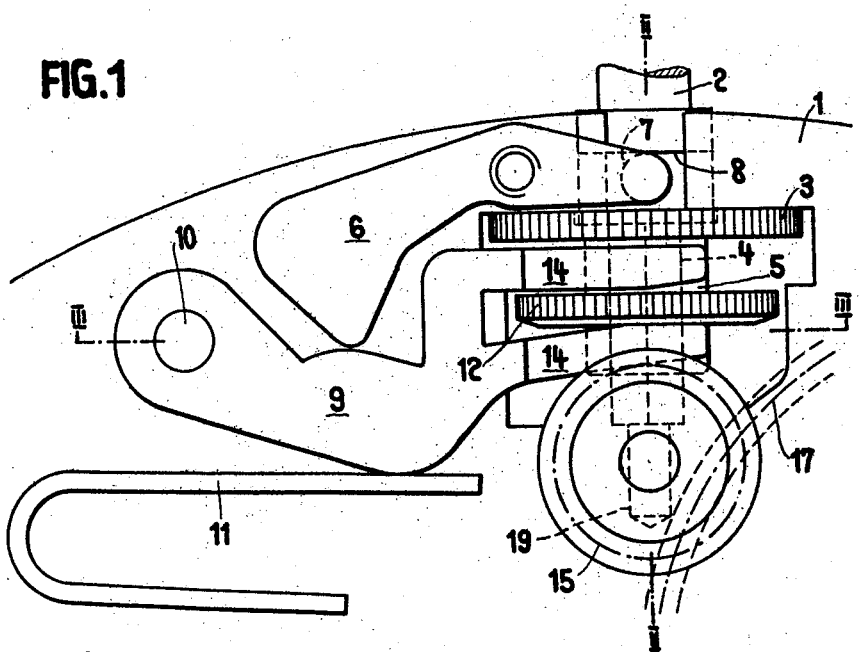
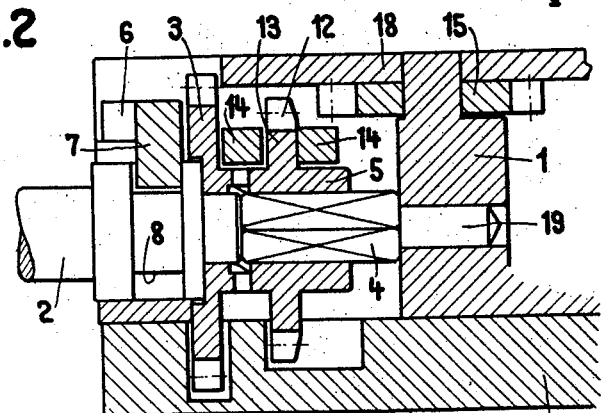
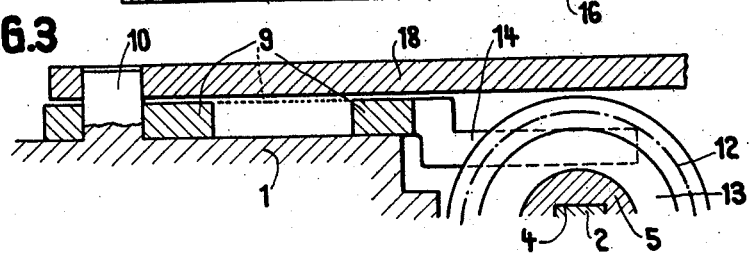
INVENTOR
Paul L. Glocker
BY
ATTORNEYS

3,111,002
SETTING MECHANISM FOR WATCH MOVEMENTS
Paul L. Glocker, Jurastrasse 88, Grenchen, Solothurn, Switzerland
Filed Jan. 26, 1961, Ser. No. 85,129
Claims priority, application Switzerland Feb. 11, 1960
3 Claims. (Cl. 58—68)

The present invention relates to a setting mechanism for watch movements with a clutch wheel mounted on the winding stem and in mesh with a setting wheel when in setting position, the adjustment of the clutch wheel being effected by a clutch lever operated by a setting lever.

The mechanism according to the invention is characterized in that the toothing of the clutch wheel, which is to be engaged with the setting wheel, is provided on the outer circumference of a disc perpendicular to the axis of rotation of the clutch wheel, the said disc entering between the arms of a fork of the clutch lever for adjusting the clutch wheel along the winding stem.

The accompanying drawing illustrates by way of example, one embodiment of the invention.

FIG. 1 is a plan view of the mechanism from the side of the dial, after having removed the setting lever spring.

FIG. 2 is a section along the line II—II of FIG. 1, and

FIG. 3 is a section along the line III—III of FIG. 1.

On the pillar plate 1 there is mounted in a slidable manner the winding and hands-setting stem 2 carrying in a freely rotatable way a winding pinion 3 meshing in the usual manner with a non-represented crown wheel. On a square portion 4 of the stem 2 there is freely adjusted a clutch wheel 5 provided on its end face with a lateral clutch toothing engaging a corresponding toothing on the end face of the winding pinion 3. A setting lever 6 pivoted on the pillar plate 1 carries a guard 7 engaged in a groove 8 of the stem 2. A clutch lever 9 is pivoted on a pin 10 of the pillar plate 1 and is under the constraint of a spring 11 tending to swing the lever 9 in the anticlockwise direction of FIG. 1.

Instead of having the usual crown toothing the clutch wheel 5 has a toothing 12 on the outer circular circumference of a disc 13 whose median plane is perpendicular to the axis of the clutch wheel 5. In the illustrated example the disc 13 is made in one piece with the remaining portion of the clutch wheel 5 but may, as well, be an individual piece fixed to (such as driven onto) the remaining portion of the clutch wheel. The clutch lever 9 ends in two arms 14 lying on one side of the axis of the stem and spaced axially thereof. These arms constitute a fork and the disk 13 of the clutch wheel 5 enters with a small play into the space between the arms 14 in order to allow the arms 14 to displace the clutch wheel 5 along the stem 2. A setting wheel 15 with its axis perpendicular to the axis of the stem 2 is pivoted on the pillar plate 1 near the inner end of the stem 2. As usual, the setting wheel 15 is in mesh with the well-known minute wheel (not shown). The barrel bridge is designated by 16, the barrel, illustrated by its ratchet wheel, by 17 and the setting lever spring (FIG. 3) by 18.

In the condition shown in the drawing, the stem 2 is in winding position. The clutch lever 9, under the constraint of the spring 11 is urged towards the top of FIG. 1 and one of the arms 14 holds the clutch toothing of the clutch wheel 5 in mesh with the corresponding clutch toothing of the winding pinion 3. If the stem 2 is now pulled towards the outside of the guard 7 swings the setting lever 6 in the anticlockwise direction of FIG. 1 so that the setting lever 6 turns the clutch lever 9 by a certain angle in the clockwise direction against the constraint of the spring 11. During that movement the clutch lever 9 cooperates by the other of its arms 14 with the disc 13 of the clutch wheel 5 and adjusts the latter along the winding stem 2. In consequence the clutch toothing of the clutch wheel 5 is disengaged from the clutch toothing of the winding pinion 3 and the toothing 12 of the disc 13 of the clutch wheel 5 is engaged with the setting wheel 15. In order to facilitate such engagement the toothing 12 of the clutch wheel 5 is, by preference, chamfered as shown in FIG. 2. If the stem 2 is again pushed inwards, the setting lever 6 ceases to act onto the clutch lever 9 and the spring 11 returns the clutch lever 9 into initial position so that the clutch wheel 5 is disengaged from the setting wheel 15 and re-engaged with the winding pinion 3.

In the illustrated example, the disc 13 of the clutch wheel 5 is disposed approximately in the middle of the length of the clutch wheel 5. In a modification the disc 13 may be arranged at or near the inner end of the clutch wheel 5, in which case, however, the guide of the clutch wheel 5 would be shorter and the load less equilibrated.

The clutch lever 9 shown in the drawing has, in the plane of FIG. 3, a bending, but might also be straight. This bending depends on the respective heights or levels of the clutch lever 9 and the clutch wheel 5.

As shown in FIG. 1 the barrel 17 extends to below the setting wheel 15 and near to the pin 19 (inner end) of the winding stem 2.

The important advantage of the construction according to the invention resides in the possibility of using a barrel of larger diameter and greater thickness than in prior mechanism where the clutch wheel 5 has a crown toothing and a groove receiving the outer end of the clutch lever. The larger barrel allows the use of a more powerful mainspring which is of great advantage.

If in the mechanism of FIGS. 1 and 2 a classical clutch wheel with a crown toothing were used, the guide of the clutch wheel would be much too short and the clutch wheel could not be displaced along the winding stem 2. For increasing the guide length of the classical clutch wheel the setting wheel 15 would have to be smaller or the barrel to be arranged further away or the barrel would have to be smaller. However, none of these expedients would be satisfactory. The reduction of the diameter of the setting wheel 15 would result in such a small setting wheel that it could not be manufactured. Moreover, there is no possibility of displacing the barrel because there would be insufficient space available for the gear wheels, especially in small watch movements. Therefore, there would remain only the possibility of reducing the barrel; however, it is just such a reduction which should be avoided. Finally, one might try to reduce the diameter of the clutch wheel; however, this would result in an increase of the thickness of the setting wheel bringing about the reduction of the barrel's thickness and, thereby, the reduction of the power of the mainspring. The inventive idea, i.e., the replacement of the crown toothing of the clutch wheel by a toothing on the outer circumference of a disc and elimination of the groove in the clutch wheel for the clutch lever fork allows use of a shorter clutch wheel and a greater guide length for the clutch wheel without necessitating the above-described disadvantageous expedients, every possibility being offered to the designer to choose a barrel of large diameter and large thickness and, in consequence, to provide a mainspring of great power.

While the invention has been described and illustrated with reference to a specific embodiment thereof, it will be understood that other embodiments and performances may be resorted to without departing from the invention. Therefore, the performance of the invention set out above should be considered as illustrative and not as limiting the scope of the following claims:

I claim:

1. A setting mechanism for watch movements comprising a winding stem shiftable axially between winding and setting positions, a setting wheel, a clutch wheel mounted for axial sliding movement on said winding stem and rotatable therewith, said clutch wheel having a toothed portion for meshing with said setting wheel when the winding stem is in setting position, a setting lever and a clutch lever including a fork so arranged and connected with the winding stem and clutch wheel that shifting of the winding stem to the setting position moves the setting lever against the clutch lever to shift the clutch wheel into mesh with the setting wheel, said clutch wheel having a disc perpendicular to the axis of said winding stem, the teeth of said toothed portion of the clutch wheel being formed on the outer circumference of said disc and lying in the plane of the disc, said clutch lever fork having axially spaced arms lying on one side of the axis of the winding stem, and the said disc of the clutch wheel being positioned between the arms of said fork to be shifted thereby to move the clutch wheel along the winding stem.

2. A setting mechanism as claimed in claim 1 wherein the toothing of the clutch wheel is chamfered towards the side of the setting wheel in order to facilitate its re-engaging with the setting wheel.

3. A setting mechanism as claimed in claim 1 wherein the said disc is disposed approximately in the middle of the axial length of the clutch wheel.

References Cited in the file of this patent

UNITED STATES PATENTS

| | | |
|---|---|---|
| 720,259 | Kuenzel | Feb. 10, 1903 |
| 1,007,430 | Cochran | Oct. 31, 1911 |
| 1,226,286 | Wehinger | May 15, 1917 |
| 1,476,494 | Cooper et al. | Dec. 4, 1923 |
| 2,237,231 | Keyes | Apr. 1, 1941 |